(12) United States Patent
Rubino et al.

(10) Patent No.: US 12,537,135 B2
(45) Date of Patent: Jan. 27, 2026

(54) MINIATURE ELECTROCHEMICAL CELL HAVING A CASING OF A CONDUCTIVE PLATE CLOSING AN OPEN-ENDED CERAMIC CONTAINER HAVING A VIA HOLE SUPPORTING AN ELECTRICALLY CONDUCTIVE PATHWAY

(71) Applicant: Greatbatch Ltd., Clarence, NY (US)

(72) Inventors: Robert S. Rubino, Williamsville, NY (US); David Dianetti, Lancaster, NY (US); Xiaohong Tang, Williamsville, NY (US)

(73) Assignee: Greatbatch Ltd., Clarence, NY (US)

( * ) Notice: Subject to any disclaimer, the term of this patent is extended or adjusted under 35 U.S.C. 154(b) by 742 days.

(21) Appl. No.: 17/817,670

(22) Filed: Aug. 5, 2022

(65) Prior Publication Data

US 2022/0384883 A1 Dec. 1, 2022

Related U.S. Application Data

(63) Continuation of application No. 16/653,247, filed on Oct. 15, 2019, now Pat. No. 11,509,011.

(51) Int. Cl.
*H01G 4/236* (2006.01)
*H01M 50/117* (2021.01)
(Continued)

(52) U.S. Cl.
CPC .......... *H01G 4/236* (2013.01); *H01M 50/117* (2021.01); *H01M 50/147* (2021.01);
(Continued)

(58) Field of Classification Search
CPC ............ H01M 50/191; H01M 50/169; H01M 50/159; H01M 50/545; H01M 50/117;
(Continued)

(56) References Cited

U.S. PATENT DOCUMENTS 4,873,615 A * 10/1989 Grabbe ............... H01L 25/0655
174/541
5,415,959 A 5/1995 Pyszczek et al.
(Continued)

OTHER PUBLICATIONS

, "ASTM A36 Mild/Low Carbon Steel, AZO Materials, <https://www.azom.com/article.aspx?ArticleID=6117> (Year: 2012)".
(Continued)

*Primary Examiner* — Jessie Walls-Murray
(74) *Attorney, Agent, or Firm* — Michael F. Scalise

(57) ABSTRACT

A miniature electrochemical cell having a volume of less than 0.5 cc is described. The cell casing comprises an open-ended ceramic container having a via hole providing an electrically conductive pathway extending through the container. A metal lid closes the open-end of the container. An electrode assembly housed inside the casing comprises an anode current collector deposited on an inner surface of the ceramic container in contact with the electrically conductive pathway in the via hole. An anode active material contacts the current collector and a cathode active material contacts the metal lid. A separator is disposed between the anode and cathode active materials. That way, the electrically conductive pathway serves as a negative terminal, and the lid, electrically isolated from the conductive pathway by the ceramic container, serves as a positive terminal. The negative and positive terminals are configured for electrical connection to a load.

23 Claims, 1 Drawing Sheet

(51) Int. Cl.
*H01M 50/147* (2021.01)
*H01M 50/159* (2021.01)
*H01M 50/172* (2021.01)
*H01M 50/50* (2021.01)
*H01M 50/528* (2021.01)
*H01M 50/531* (2021.01)
*H01M 50/545* (2021.01)
*H01M 50/548* (2021.01)
*H01M 50/559* (2021.01)
*H01M 50/109* (2021.01)
*H01M 50/153* (2021.01)

(52) U.S. Cl.
CPC ....... *H01M 50/159* (2021.01); *H01M 50/172* (2021.01); *H01M 50/528* (2021.01); *H01M 50/531* (2021.01); *H01M 50/545* (2021.01); *H01M 50/548* (2021.01); *H01M 50/559* (2021.01); *H01M 50/109* (2021.01); *H01M 50/153* (2021.01); *H01M 50/50* (2021.01); *H01M 2220/30* (2013.01)

(58) Field of Classification Search
CPC ............. H01M 50/172; H01M 50/109; H01M 50/153; H01G 4/236; H01G 4/30; H01G 4/12; H01G 4/248
See application file for complete search history.

(56) References Cited

U.S. PATENT DOCUMENTS

| | | | |
|---|---|---|---|
| 6,765,779 B2 | 7/2004 | Stevenson et al. | |
| 8,603,667 B1 | 12/2013 | Mano et al. | |
| 8,653,384 B2 | 2/2014 | Tang et al. | |
| 9,492,659 B2 | 11/2016 | Brendel et al. | |
| 10,249,415 B2 | 4/2019 | Seitz et al. | |
| 10,272,252 B2 | 4/2019 | Seitz et al. | |
| 10,350,421 B2 | 7/2019 | Stevenson et al. | |
| RE47,624 E | 10/2019 | Tang et al. | |
| 2003/0003356 A1 | 1/2003 | Tsukamoto et al. | |
| 2004/0146780 A1* | 7/2004 | Rubino | H01M 50/169 |
| | | | 429/231.95 |
| 2004/0231877 A1* | 11/2004 | Wolf | H01M 50/172 |
| | | | 174/50.61 |
| 2005/0037258 A1* | 2/2005 | Itoh | H01L 23/49861 |
| | | | 429/162 |
| 2005/0147880 A1* | 7/2005 | Takahashi | H01M 50/531 |
| | | | 429/176 |
| 2007/0000775 A1 | 1/2007 | Nakahara et al. | |
| 2008/0057390 A1 | 3/2008 | Kondo et al. | |
| 2009/0214899 A1 | 8/2009 | Shakespeare et al. | |
| 2013/0032391 A1* | 2/2013 | Morioka | A61N 1/375 |
| | | | 174/650 |
| 2013/0157121 A1 | 6/2013 | Tamachi et al. | |
| 2013/0184797 A1* | 7/2013 | Tang | H02G 3/22 |
| | | | 607/116 |
| 2014/0049878 A1 | 2/2014 | Tamachi et al. | |
| 2014/0087243 A1* | 3/2014 | Onodera | H01G 11/86 |
| | | | 429/179 |
| 2014/0212744 A1* | 7/2014 | Shigematsu | H01M 50/103 |
| | | | 429/186 |
| 2018/0108496 A1 | 4/2018 | Venkateswaran et al. | |
| 2018/0272137 A1 | 9/2018 | Seitz et al. | |

OTHER PUBLICATIONS

"Electrical Type of the elements, PeriodicTable.com, <https://periodictable.com/Properties/A/ElectricalType.html> (Year: 2008)".
"IJ Research, Inc., "Ceramic to Metal Seals—Brazing and Joining", <http://www.ijresearch.com/ceramic-to-metal-seal-2/> (Year: 2013)".
"Kovar—an overview/ ScienceDirect (https://www.sciencedirect.com/topics/materials-science/kovar".
"Kovar Technical Data, High Temp Metals, <https://www.hightempmetals.com/techdata/hitempKovardata.php> (Year: 2015)".

\* cited by examiner

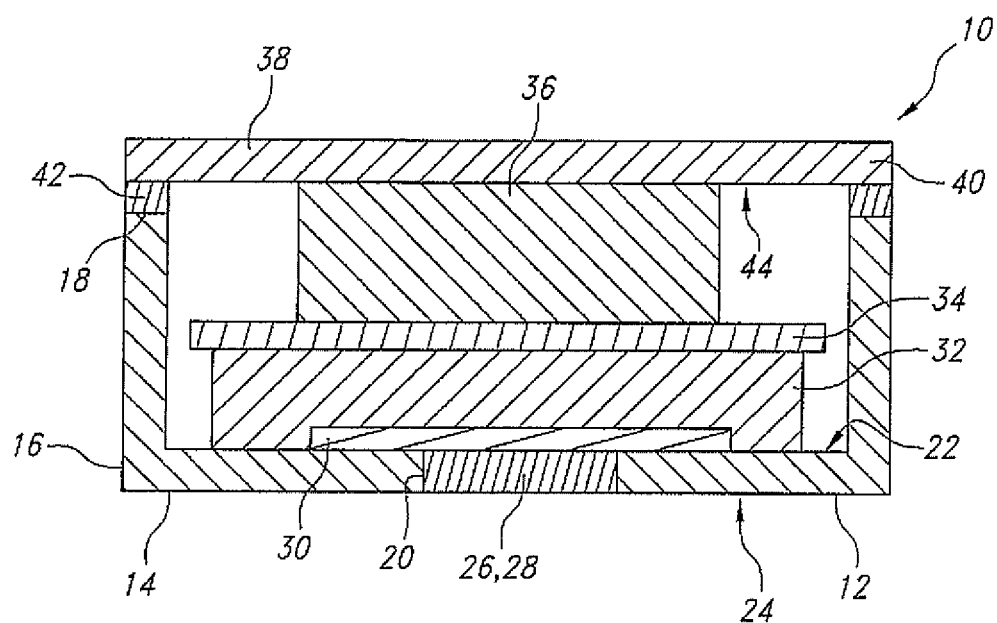

MINIATURE ELECTROCHEMICAL CELL HAVING A CASING OF A CONDUCTIVE PLATE CLOSING AN OPEN-ENDED CERAMIC CONTAINER HAVING A VIA HOLE SUPPORTING AN ELECTRICALLY CONDUCTIVE PATHWAY

CROSS-REFERENCE TO RELATED APPLICATION

The present application is a continuation of U.S. application Ser. No. 16/653,247, filed on Oct. 15, 2019, now U.S. Pat. No. 11,509,011.

BACKGROUND OF THE INVENTION

1. Field of the Invention

This invention relates to the conversion of chemical energy to electrical energy. More particularly, the present invention relates to an electrochemical cell that preferably has a total size or volume that is less than 0.5 cc. Such so-called miniaturized electrochemical cells enable numerous new and improved medical device therapies. Miniature electrochemical cells are defined as those having a size or total volume that is less than 0.5 cc.

2. Prior Art

Electrochemical cells must have two opposite polarity terminals that are electrically isolated from each other. In use, the terminals are connected to a load, such as the circuitry of an implantable medical device to power the medical device. In that respect, an electrochemical cell which is sufficiently hermetic to prevent ingress of moisture and egress of electrolyte so that it can operate for ten years or more requires robust sealing methodologies while still providing adequate electrical isolation between the opposite polarity terminals. However, conventional sealing techniques are often not practical when cell size drops below 0.5 cc. That is because the seals themselves take up a major portion of the overall cell volume.

For that reason, the present invention provides a casing construction that is suitable for use with both hermetically sealed primary and secondary or re-chargeable electrochemical cells. While useful with cells of virtually any size, the present hermetic casing is particularly well suited for cells having a total volume or size that is less than 0.5 cc.

SUMMARY OF THE INVENTION

The present invention describes an electrochemical cell that is enabled by a casing construction which is readily adapted to miniature cell designs. However, while the present casing is adapted for miniature electrochemical systems, the casing design is also applicable to cells that are not classified as "miniature". A miniature electrochemical cell is defined as one having a total volume that is less than 0.5 cc.

A known problem with conventional miniature electrochemical cell designs is the need for the materials from which the cell is constructed to be both chemically compatible with each other and not susceptible to undesirable corrosion reactions. A miniature electrochemical cell according to the present invention uses an electrically conductive metal-containing paste that is filled into a via hole extending through a cup-shaped, open-ended ceramic container. The via hole is formed (drilled, punched or cut) with the ceramic container being in a green state. The open-ended ceramic container is then sintered to transform the metal-containing paste into a solid electrically conductive pathway extending through the sintered ceramic container.

Next, an anode current collector is deposited on an inner surface of the open-ended ceramic container in contact with the electrically conductive pathway. In addition to providing electrical conduction from the to-be-deposited anode active layer to the electrically conductive material residing in the via hole, the anode current collector protects the metallic electrically conductive material from corrosive reactions with other battery components while exhibiting good adhesion to the ceramic container or, should there be one, to an adhesion layer, for example an adhesion layer of titanium, on an inner surface of the ceramic container. An exemplary anode current collector according to the present invention is from about 0.1 microns to about 50 microns thick and is comprised of a metallic layer deposited on the inner surface of the ceramic container using a physical vapor deposition (PVD) process, for example sputtering deposition or evaporation deposition, so that the deposited metal serving as the current collector covers the via hole. Exemplary current collector materials include nickel, titanium, copper, and Ti/NiV composites.

An anode active material is deposited on the current collector opposite the electrically conductive pathway. The anode active material is pressed into a pellet, spray-coated, or printed and has a shape that encases the anode current collector to contact the inner surface of the ceramic container. That way, the anode active material is in electrical continuity with the electrically conductive pathway through the current collector. The electrically conductive pathway serves as the negative terminal for the electrochemical cell.

A separator is supported on the anode active material opposite the electrically conductive material in the anode via hole. A cathode active material contacts the separator opposite the anode active material. Just before the open end of the ceramic container is closed with an electrically conductive cover plate or lid, a nonaqueous electrolyte is filled into the container. The electrolyte serves to activate the electrode assembly comprising the anode and cathode active materials prevented from direct physical contact with each other by the intermediate separator.

An intermediate ring-shaped gold pre-form resides between the electrically conductive lid and the upper edge of an annular sidewall comprising the open-ended ceramic container. Alternatively, a physical vapor deposition (PVD) process is used to coat gold onto the upper edge of the annular sidewall or onto an inner surface of the titanium lid. Preferably, the upper annular edge of the container is metallized prior to contacting the gold to the container. Then, an ultra-sonic welding process or a laser welding process is used to melt and seal the gold to the metal lid and to the ceramic container, thereby closing the open end of the container. An important aspect of the present miniature electrochemical cell is that the cathode active material directly contacts an inner surface of the lid. That way, the lid serves as the positive terminal for the electrochemical cell.

Thus, the present invention describes a miniature electrochemical cell activated with a nonaqueous electrolyte. The anode or negative terminal is comprised of a metal-containing material residing in and hermetically bonded or sealed to an anode via hole extending through the cup-shaped ceramic container. The hermetic bond is formed by co-firing a metal-containing paste filled into the via hole extending through a green ceramic body comprising the ceramic container. The metal-containing material is preferably substantially pure platinum, or a platinum/ceramic composite and the open-ended ceramic container is comprised of 3% YSZ or alumina. The metal lid is sized and shaped (configured) to close the open end of the ceramic container to thereby provide the cell casing. The cathode active material contacts the lid and the separator opposite the anode active material.

Alternatively, the metal-containing material in the anode via hole is gold, which is formed by brazing gold into a via hole formed (drilling, punching, cutting, machining, and waterjet cutting) through the pre-sintered ceramic container. Prior to sintering the green-state ceramic container, the via hole is coated with titanium or titanium and niobium to facilitate gold wetting of the via hole wall.

The present electrochemical cell is not limited to any one chemistry and can be of an alkaline cell, a primary lithium cell, a rechargeable lithium cell, a Ni/cadmium cell, a Ni/metal hydride cell, a supercapacitor, a thin film solid-state cell, and the like. Preferably, the cell is a lithium-ion electrochemical cell comprising a carbonaceous anode or $Li_4Ti_5O$-based anode and a lithiated metal oxide-based cathode, such as of $LiCoO_2$ or lithium nickel manganese cobalt oxide ($LiNi_aMn_bCo_{1-a-b}O_2$). In an alternate embodiment, the cell is of a primary chemistry having a lithium anode and a metal oxide cathode, for example a silver vanadium oxide cathode active material. Fluorinate carbon ($CF_x$) is another suitable cathode active material.

These and other aspects of the present invention will become increasingly more apparent to those of ordinary skill in the art by reference to the following description and the appended drawings.

BRIEF DESCRIPTION OF THE DRAWING

FIG. 1 is a cross-sectional view of one embodiment of a miniature electrochemical cell 10 according to the present invention.

DETAILED DESCRIPTION OF THE PREFERRED EMBODIMENTS

A miniature cell according to the present invention is not limited to any one electrochemical system or chemistry. The miniature electrochemical cell can be an alkaline cell, a primary lithium cell, a rechargeable lithium cell, a Ni/cadmium cell, a Ni/metal hydride cell, a supercapacitor, a thin film solid-state cell, and the like. An exemplary miniature electrochemical cell is of a lithium-ion chemistry having a carbon-based anode and a metal oxide-based cathode, such as a cathode of $LiCoO_2$ or $LiNi_aMn_bCo_{1-a-b}O_2$ activated with a liquid electrolyte.

Referring now to the drawing, FIG. 1 illustrates an exemplary embodiment of a miniature electrochemical cell 10 according to the present invention. The cell 10 has a casing comprising an open-ended container 12 of an electrically insulative ceramic material. The container 12 comprises a base 14 supporting an outwardly extending annular sidewall 16. The annular sidewall 16 extends to an annular edge 18 spaced from the base 14. Preferably the sidewall 16 meets the base 14 at a right angle.

The ceramic container 12 is comprised of 3% YSZ or essentially high purity alumina ceramic of the chemical formula $Al_2O_3$. "Essentially pure" means that the post-sintered ceramic is at least 96% alumina up to 99.999% alumina. In various embodiments, the post-sintered ceramic container 12 is at least 90% alumina, preferably at least 92% alumina, more preferably at least 94% alumina, and still more preferably at least 96% alumina.

The design of the container 12 is not limited to any one shape. As those skilled in the art will readily recognize, a myriad of different shapes is contemplated for the open-ended container 12, the specific shape being limited only by the form factor for the application or device that the cell 10 is intended to power. In that respect, a cross-section of the annular sidewall 16 has the same shape as the periphery of the base 14.

The base 14 of the electrically insulative ceramic container 12 is provided with a via hole 20 that extends to a base inner surface 22 and a base outer surface 24. The via hole 20 is preferably formed by drilling, punching, cutting, machining, and waterjet cutting through the ceramic.

A platinum-containing material, for example a substantially closed pore, fritless and substantially pure platinum material 26, fills the via hole 20 to thereby form an electrically conductive pathway extending between and to the inner and outer surfaces 22, 24 of the ceramic base 14 of the open-ended container 12. The platinum-containing material 26 is hermetically sealed to the ceramic base 14 and has a leak rate that is not greater than $1 \times 10^{-7}$ std. cc He/sec.

According to another embodiment of the present invention, in lieu of the substantially pure platinum material 26, the via hole 20 is filled with a composite reinforced metal ceramic (CRMC) material 28. The CRMC material 28 is a platinum-containing material that comprises, by weight %, from about 10:90 ceramic:platinum to about 90:10 ceramic:platinum or, from about 70:30 ceramic:platinum to about 30:70 ceramic:platinum.

Examples of suitable CRMC materials 28 include, but are not limited to:

a) Alumina ($Al_2O_3$) or zirconia ($ZrO_2$) including various stabilized or partially stabilized zirconia like zirconia toughened alumina (ZTA) and alumina toughened zirconia (ATZ) with platinum (Pt) or palladium (Pd); and b) Alumina ($Al_2O_3$) or zirconia ($ZrO_2$) with iridium, rhenium, rhodium, various Pt alloys (e.g., Pt—Ir, Pt—Pd, Pt—Rh, Pt—Re, Pt—Au, Pt—Ag etc.), Pd alloys (e.g., Pd—Ir, Pd—Re, Pd—Rh, Pd—Ag, Pd—Au, Pd—Pt, Pd—Nb, etc.), Au alloys (e.g., Au—Nb, Au—Ti, etc.), Au alloys (e.g., Au—Nb, Au—Ti, etc.), and Ti alloys (e.g., Ti—Al—V, Ti—Pt, Ti—Nb, etc.).

Other non-limiting biocompatible metals and alloys that may be used in place of platinum include niobium, platinum/palladium, stainless steels, and titanium.

Furthermore, any of the following materials may be used alone or in combination with any of the materials already discussed or within this list: gold (Au), silver (Ag), iridium (Ir), rhenium (Re), rhodium (Rh), titanium (Ti), tantalum (Ta), tungsten (W), zirconium (Zr), and vanadium (V); cobalt chromium molybdenum alloy, cobalt chromium nickel iron molybdenum manganese alloy, cobalt chromium tungsten nickel iron manganese alloy, cobalt nickel chromium iron molybdenum titanium alloy, cobalt nickel chromium iron molybdenum tungsten titanium alloy, cobalt nickel chromium molybdenum alloy, copper aluminum nickel alloy, copper zinc alloy, copper zinc aluminum nickel alloy, copper zinc silver alloy, gold platinum palladium silver indium alloy, iron chromium alloy, iron chromium nickel alloy, iron chromium nickel aluminum alloy, iron chromium nickel copper alloy, iron chromium nickel copper molybdenum niobium alloy, iron chromium nickel copper niobium alloy, iron chromium nickel copper titanium niobium alloy, iron chromium nickel manganese molybdenum alloy, iron chromium nickel molybdenum alloy, iron chromium nickel molybdenum aluminum alloy, iron chromium nickel titanium molybdenum alloy, iron manganese chromium molybdenum nitrogen alloy, nickel platinum alloy, nitinol, nickel titanium alloy, nickel titanium aluminum alloy, niobium-titanium alloy, platinum iridium alloy, platinum palladium gold alloy, titanium aluminum vanadium alloy, titanium based aluminum iron alloy, titanium based aluminum molybdenum zirconium alloy, titanium based molybdenum niobium alloy, titanium based molybdenum zirconium iron alloy, titanium based niobium zirconium alloy, titanium based niobium zirconium tantalum alloy, titanium molybdenum alloy, titanium niobium alloy, titanium platinum alloy, and titanium-based molybdenum zirconium tin alloy.

The interfacial boundary between the ceramic base 14 and the substantially pure platinum-containing material 26 or CRMC material 28 forms a meandering or undulating path of sufficient tortuousity so that the boundary inhibits crack initiation, and more importantly, crack propagation, and additionally, because of the intimacy of the interface, impairs leakage of fluids. As used herein, the word tortuous or tortuousity refers to the roughened, complex, or undulating interface that is formed at the boundary between the ceramic base 14 and the substantially pure platinum-containing material 26 or the CRMC material 28. This tortuous interface is characterized by hills and valleys which are topographically three dimensional and form very strong and reliable hermetic bonds.

In an exemplary embodiment of the present invention, a method of manufacturing the open-ended container 12 comprising the electrically conductive pathway 26 or 28 includes forming the base 14 supporting the outwardly extending annular sidewall 16 having the desired form factor, the container 12 being in a green state and comprising at least 96% alumina; forming the via hole 20 extending through the ceramic base 14; filling the via hole 20 with an electrically conductive paste (not shown), the electrically conductive paste comprising a mixture of a substantially pure platinum powder, an inactive organic binder, and possibly a solvent and/or plasticizer, or a CRMC powder and an inactive organic binder, solvent and/or plasticizer; placing the green-state ceramic container 12 and conductive paste filled via hole 20 into an air filled heating chamber and heating the assembly to form a sintered monolithic structure. It is believed that the resulting substantially pure platinum-containing material 26 forms an interface with the ceramic container 12 comprising a glass that is at least about 60% silica.

It is understood that throughout this disclosure when substantially pure platinum and CRMC pastes are referred to, those pastes include solvents and binders that are baked out during sintering. Suitable binders are selected from the group consisting of ethyl cellulose, acrylic resin, polyvinyl alcohol, polyvinyl butyral and a poly(alkylene carbonate) having the general formula R—O—C(=O)—O with R=$C_1$ to $C_5$. Poly(ethylene carbonate) or poly(propylene carbonate) are preferred poly(alkylene carbonates). Suitable solvents are selected from the group consisting of terpineol, butyl carbitol, cyclohexanone, n-octyl alcohol, ethylene glycol, glycerol, water, and mixtures thereof.

In another exemplary embodiment, forming the ceramic container 12 comprises laminating a plurality of ceramic green sheets together to thereby provide the desired form factor, followed by sintering.

In greater detail, to achieve sustainable hermeticity between the platinum-containing material 26 and the ceramic base 14, the following is required. Because the coefficient of thermal expansion (CTE) of platinum is sufficiently higher than the CTE of alumina, it is not theoretically possible for alumina to provide compressive forces on a solid platinum body, for example a solid platinum wire, residing in a via hole extending through the alumina. To overcome the CTE differences between these two materials, a platinum body residing in an alumina via hole must be formed using a platinum paste having a minimum of 80% platinum solids loading. The term "paste" is defined as a smooth, soft mass having a pliable consistency and comprising pure platinum particles, a binder material and a solvent. In a preferred embodiment, the solids loading of platinum particles in the paste is about 90%. In a more preferred embodiment, the solids loading of platinum particles in the paste is about 95%.

In addition, the via hole 20 must be packed so that the platinum-containing paste occupies at least about 90% of its available space. In a preferred embodiment, the platinum-containing paste occupies about 95% of the via hole space. In a more preferred embodiment, the platinum-containing paste occupies about 99% of the via hole 20.

The shrinkage of the alumina must not be greater than about 20% of that of the volume of the platinum-containing paste in the via hole 20. In a preferred embodiment, shrinkage of the alumina is about 14% of the volume of the platinum-containing paste in the via hole 20. In a more preferred embodiment, shrinkage of the alumina is about 16% of the volume of the platinum-containing paste in the via hole 20.

After the platinum-containing paste is filled into the via hole 20 extending through the ceramic base 14, the open-ended ceramic container 12 is exposed to a controlled co-firing heating profile in ambient air that comprises a binder bake-out portion, a sinter portion, and a cool down portion.

In one embodiment, the binder bake-out portion of the controlled co-firing heating profile is performed at a temperature of from about 400° C. to about 700° C. for a minimum of about 4 hours. A preferred binder bake-out protocol is performed at a temperature of from about 550° C. to about 650° C. A more preferred binder bake-out is performed at a temperature of from about 500° C. to about 600° C.

Next, the sintering portion of the controlled co-firing heating profile is preferably performed at a temperature ranging from about 1,400° C. to about 1,900° C. for up to about 6 hours. A preferred sintering profile is at a temperature from about 1,500° C. to about 1,800° C. A more preferred sintering temperature is from about 1,600° C. to about 1,700° C.

Then, the cool down portion of the controlled co-firing heating profile occurs either by turning off the heating chamber and allowing the chamber to equalize to room temperature or, preferably by setting the cool down portion at a rate of up to about 5° C./min from the hold temperature cooled down to about 1,000° C. At about 1,000° C., the chamber naturally equalizes to room temperature. A more preferred cool down is at a rate of about 1° C./min from the hold temperature to about 1,000° C. and then allowing the heating chamber to naturally equalize to room temperature. In so doing, a robust hermetic seal is achieved between the mating materials of the ceramic container 12 and the platinum-containing material 26 in the via hole 20.

During processing, compression is imparted by the ceramic base 14 around the platinum-containing paste in the via hole 20 due to volume shrinkage of the alumina being greater than that of the paste. Furthermore, the platinum is sufficiently malleable at this phase to favorably deform by the compressive forces applied by the ceramic base 14. The combination of the platinum solids loading in the paste, the platinum packing in the via hole 20 and the shrinkage of the ceramic base 14 being greater than that of the platinum-containing paste as the paste is solidified to a solid platinum-containing material results in the platinum taking the shape of the mating alumina surface. The amount of platinum solids loading, its packing percentage in the via hole 20 and the malleability of the platinum material all contribute to formation of a hermetic seal between the platinum-containing material 26 and the ceramic base 14. In addition, the compressive forces that result from the greater volumetric shrinkage of the ceramic base 14 than that of the platinum-containing material 26 in the via hole 20 limit expansion of the platinum and force the platinum to deform to the contour of the surface of the via hole 20 to consequently form a hermetic seal. Thus, an interface between the ceramic base 14 and the platinum-containing material 26 that conforms to the respective interface surfaces and results in a nearly exact mirror image of the interfacing surfaces is formed, thereby creating a hermetic bond therebetween.

Analysis of the interface between the ceramic base 14 and the platinum-containing material 26 of this invention showed not only the creation of an intimate interface, but, in the case of the interfacial layer, a hermetic structure that exhibits an amorphous layer at the interface comprising the elements platinum, aluminum, carbon and oxygen that appear to impart resistance to erosion by body fluids. Both these bonding mechanisms, direct bonding and an amorphous interfacial layer, offer additional tolerance to the CTE mismatch between the ceramic base 14 and the platinum-containing material 26.

On the other hand, CRMC very closely matches the CTE of the alumina. This results in a very good hermetic seal between the CRMC and the ceramic container 12. Under certain processing conditions cermets may form a thin glass layer or even an alumina layer over the via ends. In that case, it may be necessary to perform an additional manufacturing step, such as acid etch, lapping or mechanical abrasion, to remove this formed layer.

While the above description regarding the controlled co-firing heating profile has been presented with respect to an alumina ceramic, it is believed that 3% YSZ ceramic will function in a similar manner.

For additional information regarding via holes filled with electrically conductive materials, reference is made to U.S. Pat. No. 8,653,384 to Tang et al., U.S. Pat. No. 9,492,659 to Tang et al., U.S. Pat. No. 10,249,415 to Seitz et al. and RE47,624 to Tang et al. (which is a re-issue of the '384 patent). These patents are assigned to the assignee of the present invention and incorporated herein by reference. For additional information regarding via holes filled with a CRMC material, reference is made to U.S. Pat. No. 10,350,421 to Seitz et al. and U.S. Pat. No. 10,272,252 to Seitz et al. These patents are assigned to the assignee of the present invention and incorporated herein by reference.

Alternatively, the metal-containing material in the via hole 20 is gold. After sintering the green-state ceramic container and after the via hole is metallized with titanium or titanium and niobium to facilitate gold wetting of the via hole wall, a gold pre-form is positioned in the via hole 20. The ceramic container 12 is heated to melt the gold and bond it to the side walls of the metallized via hole.

After the open-ended ceramic container 12 with the platinum-containing material 26 or 28 or gold residing in the via hole 20 is made, a thin-film anode current collector 30 is contacted to the inner surface 22 of the ceramic base 14 using physical vapor deposition (PVD). The anode current collector 30 is preferably a continuous layer of nickel devoid of perforations. The nickel current collector 30 has a thickness measured outwardly from the inner surface 22 of the ceramic base 14 that ranges from about 0.1 μm to about 3 μm. Titanium, stainless steel, tantalum, platinum, gold, aluminum, cobalt, molybdenum, a Ti/NiV composite, and alloys thereof are also suitable materials for the anode current collector 30.

A layer of anode active material 32 is supported on the anode current collector 30. The anode active material 32 preferably extends outwardly beyond the peripheral edge of the current collector 30 to contact the inner surface 22 of the ceramic container. In that respect, the anode active material 32 is itself a shallow cup-shaped structure. The anode active material 32 has a thickness that ranges from about 25 μm to about 4,000 μm. Suitable anode active materials include lithium and its alloys and intermetallic compounds including, for example, Li—Si, Li—Sn, Li—Al, Li—B and Li—Si—B alloys, and mixtures and oxides thereof.

When gold resides in the via hole 20 as the electrically conductive pathway, a current collector is not needed between the gold in the via hole and the anode active material 32. Instead, the anode active material 32 can contact the gold directly.

A separator 34 is positioned on top of the anode active material 32. The separator 34 preferably extends outwardly beyond the peripheral edge of the anode active material 32 and has a thickness that ranges from about 5 μm to about 30 μm. Illustrative separator materials include non-woven glass, polypropylene, polyethylene, microporous material, glass fiber materials, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.). Other separator materials that are useful with the present invention include woven fabrics comprising halogenated polymeric fibers, as described in U.S. Pat. No. 5,415,959 to Pyszczek et al., which is assigned to the assignee of the present invention and incorporated herein by reference. Examples of halogenated polymeric materials that are suitable for the present invention include, but are not limited to, polyethylene tetrafluoroethylene which is commercially available under the name Tefzel, a trademark of the DuPont Company; polyethylenechlorotrifluoroethylene which is commercially available under the name Halar, a trademark of the Allied Chemical Company, and polyvinylidene fluoride.

A layer of cathode active material 36 contacts the separator 34 opposite the anode active material 32. In that respect, the separator 34 physically segregates the cathode active material 36 from the anode active material 32 contacting the anode current collector 30. The cathode active material 36 has a thickness that ranges from about 25 μm to about 5,000 μm.

The open end of the ceramic container 12 is closed with an electrically conductive metal cover plate or lid 38, for example, a titanium lid. The lid 38 is sized and shaped so that its outer annular edge 40 is substantially aligned with the outer surface of the container sidewall 16.

However, prior to closing the open end of the ceramic container 12 with the lid 38, a nonaqueous, ionically conductive electrolyte (not shown) having an inorganic, ionically conductive salt dissolved in a nonaqueous solvent and, more preferably, a lithium salt dissolved in a mixture of a low viscosity solvent and a high permittivity solvent is filled into the ceramic container 12. The salt serves as the vehicle for migration of the anode ions to intercalate or react with the cathode active material and suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Suitable low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for a Li/SVO or Li/$CF_x$ primary cell is 0.8M to 1.5M $LiAsF_6$ or $LiPF_6$ dissolved in a 50:50 mixture, by volume, of PC as the preferred high permittivity solvent and DME as the preferred low viscosity solvent.

An intermediate ring-shaped pre-form of gold 42 resides between the lid 38 and the upper edge 18 of the container sidewall 16. Preferably, the upper annular edge 18 is first metallized with an adhesion layer followed by a wetting layer disposed on the adhesion layer. The adhesion layer is titanium and the wetting layer comprises molybdenum or niobium.

Then, an ultra-sonic weld or laser weld is used to melt and seal the gold 42 to the metal lid 38 and the container sidewall 16, thereby closing the open end of the container. In particular, the gold 42 contacts and seals between the annular edge 18 of the ceramic container sidewall 16 and an inner surface 44 of the lid 38 proximate the lid outer annular edge 40. The gold seal 42 between the lid 38 and the wetting metallization contacting the adhesion metallization contacting the ceramic sidewall 16 has a leak rate that is not greater than $1 \times 10^{-7}$ std. cc He/sec.

With the metal lid 38 sealed to the open end of the ceramic container 12, careful control of the stack-up tolerances is important so that the cathode active material 46 physically contacts the inner surface 44 of the lid 38. To help ensure intimate and direct contact between the lid 38 and the cathode active material, the active material 36 in sheet or plate form is pressed against the inner surface 44 of the lid so that the lid "carries" the cathode active material. Alternatively, the cathode material can be spray-coated or printed onto the lid 38 using an organic binder to adhere the cathode material to the lid. That way, the metal lid 38 is in electrical continuity with the cathode active material 36 to thereby serve as the positive terminal for the electrochemical cell 10. Suitable cathode active materials are selected from $LiCoO_2$, $LiMnO_2$, $LiMn_2O_4$, $LiFePO_4$, $Ag_2V_4O_{11}$, $V_2O_5$ and lithium nickel manganese cobalt oxide ($LiNi_aMn_bCo_{1-a-b}O_2$).

Further, the anode active material 32 is in electrical continuity with the anode current collector 30 which is in turn in electrical continuity with the platinum-containing material 26 or CRMC material 28 hermetically sealed to the ceramic base 14 in the anode via hole 20. Outer surfaces of the positive polarity metal lid 38 and the negative polarity platinum-containing material 26 or the CRMC material 28 are configured for electrical connection to a load.

An exemplary chemistry for the miniature primary electrochemical cell 10 shown in FIG. 1 has lithium as an anode active material 32 and either silver vanadium oxide or fluorinate carbon ($CF_x$) and the cathode active material 36. An exemplary chemistry for the miniature secondary or re-chargeable electrochemical cell 10 shown in FIG. 1 has a carbonaceous anode material 32 and $LiCoO_2$ as a cathode active material 36. In either chemistry, the separator 34 is of polyethylene.

In the exemplary primary electrochemical cell 10, in addition to lithium as the anode active material 32, the anode can comprise metals capable of alloying with lithium at potentials below 1.0 V vs. lithium such as Sn, Si, Al, B, Si—B, and composites of those metals with inactive metals to reduce volume expansion. The form of the anode may vary, but preferably it is of a thin sheet or foil that contacts the base 14 of the ceramic container 12 and the anode current collector 30.

Broadly, the cathode of a primary cell is of an electrically conductive material, preferably a solid material. The solid cathode may comprise a metal element, a metal oxide, a mixed metal oxide, and a metal sulfide, and combinations thereof. A preferred cathode active material 36 is selected from the group consisting of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, carbon monofluoride, and mixtures thereof.

Before fabrication into an electrode for incorporation into an electrochemical cell, however, the cathode active material 36 is mixed with a binder material such as a powdered fluoro-polymer, more preferably powdered polytetrafluoroethylene or powdered polyvinylidene fluoride (PVDF) present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture for the electrochemical cell 10 thus includes a powdered fluoro-polymer binder present at about 3 weight percent, a conductive diluent present at about 3 weight percent, and about 94 weight percent of the cathode active material.

In the exemplary secondary electrochemical cell 10, in addition to lithium, the anode active materials 32 can comprise a material capable of intercalating and de-intercalating an alkali metal, preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless the form of the carbon, fibers of the carbonaceous material are particularly advantageous because they have excellent mechanical properties that permit them to be fabricated into rigid electrodes capable of withstanding degradation during repeated charge/discharge cycling.

Suitable cathode active materials 36 for the exemplary secondary electrochemical cell 10 preferably comprise a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include LiNiO$_2$, LiMn$_2$O$_4$, LiCoO$_2$, LiCo$_{0.92}$Sn$_{0.08}$O$_2$, LiCo$_{1-x}$Ni$_x$O$_2$, LiFePO$_4$, LiNi$_x$Mn$_y$Co$_{1-x-y}$O$_2$, and LiNi$_x$Co$_y$Al$_{1-x-y}$O$_2$.

For the electrochemical cell 10, the lithiated active material is preferably mixed with a conductive additive selected from acetylene black, carbon black, graphite, and powdered metals of nickel, aluminum, titanium and stainless steel. The cathode further comprises a fluoro-resin binder, preferably in a powder form, such as PTFE, PVDF, ETFE, polyamides and polyimides, and mixtures thereof.

Nickel is preferred for the anode current collector 30.

In addition to titanium, suitable materials for the lid 38 include stainless steel, mild steel, nickel-plated mild steel, but not limited thereto, so long as the metallic material is compatible for use with the other cell components.

In an alternate cell design, the cathode active material 36 is positioned inside the cell casing 12 where the anode active material 32 resides in FIG. 1 and the anode active material resides in lieu of the cathode active material. That is, the cathode active material 36 is in contact with the electrically-conductive material 26 or 28 residing in the via hole 20 and the anode active material is in contact with the lid 38.

Thus, the base 14 of the open-ended ceramic container 12 for the electrochemical cell 10 of the present invention preferably has a diameter that is less 1 cm and the outwardly extending sidewall 16 has a height that is less than 1 mm. More preferably, total volume for the cell casing comprising the lid 38 sealed to the open end of the container 12 is less than 0.5 cc. Constructing the casing from an open-ended ceramic container 12 closed by a metal lid 38 enables the miniature electrochemical cell 10 of the present invention. Moreover, the metal lid 38 is sufficiently flexible to accommodate the expected dimensional changes during discharge of the primary cell and cycling of the secondary electrochemical cell.

Now, it is therefore apparent that in an exemplary embodiment the present invention relates to a miniature electrochemical cell 10 having a total volume of less than 0.5 cc. Moreover, while embodiments of the present invention have been described in detail, such is for illustration, not limitation.

What is claimed is:

1. An electrochemical cell, comprising:
   a) a casing, comprising:
      i) an open-ended ceramic container having an annular edge meeting a ceramic container inner surface spaced from a ceramic container outer surface;
      ii) an electrically conductive pathway extending through the ceramic container to the inner and outer surfaces;
      iii) a metallization supported on the annular edge of the ceramic container;
      iv) a metal lid; and
      v) a gold laser weld or a gold ultrasonic weld hermetically sealing the metal lid to the metallization on the annular edge to thereby close the open-ended ceramic container, the metal lid having a lid inner surface; and
   b) an electrode assembly housed in the casing, the electrode assembly comprising:
      i) a current collector contacting the inner surface of the conductive pathway;
      ii) a first electroactive material contacting the current collector so that the first electroactive material is in an electrically conductive relationship with the current collector and the conductive pathway;
      iii) an opposite polarity second electroactive material directly contacting the inner surface of the metal lid; and
      iv) a separator disposed between the first and second electroactive materials; and
   c) an electrolyte in the casing in contact with the electrode assembly;
   d) wherein the conductive pathway in the electrically conductive relationship with the current collector and the first electroactive material serves as a first terminal, and
   e) wherein the metal lid electrically isolated from the conductive pathway by the ceramic container and being directly contacted to the second electroactive material serves as a second, opposite polarity terminal, and
   f) wherein the first and second terminals are configured for electrical connection to a load.

2. The electrochemical cell of claim 1, wherein the ceramic container is selected from at least 90% alumina and 3% YSZ.

3. The electrochemical cell of claim 1, wherein the metallization comprises a titanium adhesion layer contacted to the annular edge of the ceramic container, and a niobium or molybdenum wetting layer contacted to the titanium adhesion layer.

4. The electrochemical cell of claim 3, wherein the open-ended ceramic container comprises a ceramic base supporting an outwardly extending annular ceramic sidewall having the annular edge.

5. The electrochemical cell of claim 1, wherein the electrically conductive pathway is selected from gold, a substantially pure platinum material, and a composite reinforced metal ceramic (CRMC) material, the CRMC material comprising, by weight %, from about 10:90 ceramic: platinum to about 90:10 ceramic: platinum.

6. The electrochemical cell of claim 5, wherein the ceramic in the CRMC material is selected from 3% YSZ, alumina, and mixtures thereof.

7. The electrochemical cell of claim 1, wherein the electrode assembly is selected from Li/SVO, Li/CF$_x$, a carbonaceous anode/LiCoO$_2$ cathode, and a carbonaceous anode/LiNi$_a$Mn$_b$Co$_{1-a-b}$O$_2$ cathode.

8. The electrochemical cell of claim 1, wherein the metal lid is selected from titanium and stainless steel.

9. The electrochemical cell of claim 1, wherein the current collector comprises nickel.

10. An electrochemical cell, comprising:
    a) a casing, comprising:
       i) an open-ended ceramic container comprising a ceramic base meeting an outwardly extending annular ceramic sidewall having an annular edge, the annular edge meeting a ceramic container inner surface spaced from an outer surface;
       ii) a metallization comprising a titanium adhesion layer contacted to the annular edge of the ceramic container, and a niobium or molybdenum wetting layer contacted to the titanium adhesion layer;
       iii) an electrically conductive pathway extending through the ceramic base to the inner and outer surfaces thereof;
       iv) an adhesion layer directly contacting the inner surfaces of the ceramic container and the conductive pathway;
       v) a metal lid; and
       vi) a gold laser weld or a gold ultrasonic weld hermetically sealing the metal lid to the metallization on the annular edge to thereby close the open-ended ceramic container, the metal lid having a lid inner surface; and b) an electrode assembly housed in the casing, the electrode assembly comprising:
   i) a nickel current collector contacting the adhesion layer opposite the conductive pathway;
   ii) an anode active material contacting the nickel current collector so that the anode active material is in an electrically conductive relationship with the adhesion layer in turn contacting the conductive pathway in the ceramic base;
   iii) a cathode active material directly contacting the inner surface of the metal lid; and
   iv) a separator disposed between the anode and cathode active materials; and c) an electrolyte in the casing in contact with the electrode assembly;

d) wherein the conductive pathway in the electrically conductive relationship with the anode active material serves as a negative terminal, and e) wherein the metal lid electrically isolated from the conductive pathway by the ceramic container and being directly contacted to the cathode active material serves as a positive terminal, and f) wherein the negative and positive terminals are configured for electrical connection to a load.

11. The electrochemical cell of claim 10, wherein the ceramic container is selected from at least 90% alumina, 3% YSZ, and mixtures thereof.

12. The electrochemical cell of claim 10, wherein the metal lid is selected from titanium and stainless steel.

13. The electrochemical cell of claim 12, wherein the gold weld hermetically sealing the metal lid to the ceramic container has a leak rate that is not greater than $1\times10^{-7}$ std. cc He/sec.

14. The electrochemical cell of claim 10, wherein the electrically conductive pathway is selected from gold, substantially pure platinum material, and a composite reinforced metal ceramic (CRMC) material, the CRMC material comprising, by weight %, from about 10:90 ceramic: platinum to about 90:10 ceramic: platinum.

15. The electrochemical cell of claim 14, wherein the ceramic in the CRMC material is selected from 3% YSZ, alumina, and mixtures thereof.

16. The electrochemical cell of claim 11, wherein the electrode assembly is selected from Li/SVO, Li/CF$_x$, a carbonaceous anode active material/LiCoO$_2$ cathode active material, and a carbonaceous anode active material/LiNi$_a$Mn$_b$Co$_{1-a-b}$O$_2$ cathode active material.

17. An electrochemical cell, comprising:
a) a casing, comprising:
   i) an open-ended ceramic container having an annular edge meeting a ceramic container inner surface spaced from a ceramic container outer surface;
   ii) a gold pathway extending through the ceramic container to the inner and outer surfaces;
   iii) a metallization supported on the annular edge of the ceramic container;
   iv) a metal lid selected from titanium and stainless steel, the metal lid having a lid inner surface;
   v) a metallization comprising an adhesion layer contacted to the annular edge of the ceramic container and a wetting layer contacted to the adhesion layer; and
   vi) a gold laser weld or a gold ultrasonic weld sealing the metallization to the metal lid to close the open-ended ceramic container, wherein the gold weld has a leak rate that is not greater than $1\times10^{-7}$ std. cc He/sec; and b) an electrode assembly housed in the casing, the electrode assembly comprising:
   i) a first electroactive material directly contacting the gold pathway;
   ii) an opposite polarity second electroactive material directly contacting the inner surface of the metal lid; and
   iii) a separator disposed between the first and second electroactive materials; and c) an electrolyte in the casing in contact with the electrode assembly;

d) wherein in the electrically conductive relationship with the first electroactive material serves as a first terminal, and e) wherein the metal lid electrically isolated from the gold pathway by the ceramic container and being directly contacted to the second electroactive material serves as a second, opposite polarity terminal, and f) wherein the first and second terminals are configured for electrical connection to a load.

18. A method for providing an electrochemical cell, comprising the steps of:
a) providing an open-ended ceramic container comprising an annular edge meeting a ceramic container inner surface spaced from a ceramic container outer surface, wherein the ceramic container has a via hole extending to the inner and outer surfaces thereof;
b) filling a paste of a platinum-containing material into the via hole and then heating the ceramic container to transform the paste into a platinum-containing pathway hermetically sealed to the ceramic container in the via hole;
c) providing a metallization comprising contacting a titanium adhesion layer to the annular edge of the ceramic container, followed by contacting a niobium or molybdenum wetting layer to the titanium adhesion layer;
d) depositing a current collector contacting the inner surface of the ceramic container and the platinum-containing pathway;
e) contacting a first electroactive material to the current collector so that the first active material is electrically connected to the platinum-containing pathway in the via hole in the ceramic container through the current collector;
f) positioning a separator on the first electroactive material;
g) positioning a second, opposite polarity electroactive material on the separator opposite the first electroactive material;
h) activating the first and second electroactive materials with an electrolyte provided in the open-ended ceramic container;
i) providing a metal lid having a lid inner surface;
j) positioning a gold pre-form between the metallization contacting the annular edge of the ceramic container and the metal lid; and
k) ultrasonically welding or laser welding the gold pre-form to hermetically secure the metal lid to the annular edge of the container to close the open end of the ceramic container and thereby provide a casing housing the first and second electroactive materials activated by the electrolyte and separated from direct physical contact with each other by the separator, wherein the metal lid directly contacts the second electroactive material, l) Wherein the platinum-containing pathway residing in the via hole in the ceramic container and in the electrically conductive relationship with the first electroactive material serves as a first terminal, and m) wherein the metal lid electrically isolated from the platinum-containing pathway by the ceramic container, but directly contacting the second electroactive material serves as a second, opposite polarity terminal, and n) wherein the first and second terminals are configured for electrical connection to a load.

19. The method of claim 18, including selecting the ceramic container from at least 90% alumina and 3% YSZ.

20. The method of claim 18, including selecting the platinum-containing pathway in the via hole from a substantially pure platinum material and a composite reinforced metal ceramic (CRMC) material, the CRMC material comprising, by weight %, from about 10:90 ceramic: platinum to about 90:10 ceramic: platinum.

21. The method of claim 18, including providing the open-ended ceramic container in a green-state with the paste of the platinum-containing pathway comprising a binder, and subjecting the ceramic container to a heating profile comprising a binder bake-out heating portion, followed by a sinter heating portion, and then a cool down portion to thereby sinter the green-state ceramic container and transform the paste into the platinum-containing pathway hermetically sealed to the ceramic container in the via hole.

22. The method of claim 18, including providing the first electroactive material being an anode active material and the second electroactive material being a cathode active material, and further including providing the anode and cathode active materials as an electrode assembly of either a primary or a secondary chemistry.

23. The method of claim 18, including selecting the first and second electroactive materials from a carbonaceous anode active material/$LiCoO_2$ cathode active material, and a carbonaceous anode active material/$LiNi_aMn_bCo_{1-a-b}O_2$ cathode active material.

* * * * *